United States Patent [19]

Caruso

Best Available Copy

[11] E Re. 30,305

[45] Reissued Jun. 17, 1980

[54] DEVICE AND METHOD FOR PROGRAMMED HAIR COLORING

[76] Inventor: Lorenzo Caruso, 2187 Union St., San Francisco, Calif. 94123

[21] Appl. No.: 907,274

[22] Filed: May 18, 1978

Related U.S. Patent Documents

Reissue of:

[64] Patent No.: 4,020,854
Issued: May 3, 1977
Appl. No.: 579,386
Filed: May 21, 1975

[51] Int. Cl.[2] ..... A45D 8/40
[52] U.S. Cl. ..... 132/9
[58] Field of Search ..... 132/9; 35/26

[56] References Cited

U.S. PATENT DOCUMENTS

| | | | |
|---|---|---|---|
| 3,304,945 | 2/1967 | Anderson | 132/9 |
| 3,372,493 | 3/1968 | Birch | 35/26 |
| 3,390,689 | 7/1968 | Newman | 132/9 |

*Primary Examiner*—G. E. McNeil
*Attorney, Agent, or Firm*—Alfons Puishes

[57] ABSTRACT

A cap or head cover disposed for positioning on the head and scalp of the user is equipped with a plurality of holes, said holes being identified by a specific color surrounding each hole. The arrangement of the holes and colors is keyed to a series of selected programs. Desired hair color effects or styles are attained by selectively pulling strands of hair through the colored holes in accordance with the selected program by means of crocheting needles and applying suitable coloring or bleaching compounds to the strands so pulled out.

5 Claims, 6 Drawing Figures

STYLE # 80
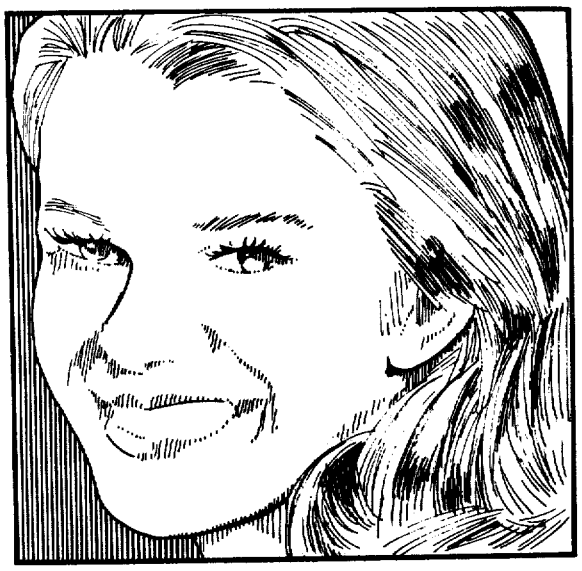
FIG. 1-A
STYLE #140
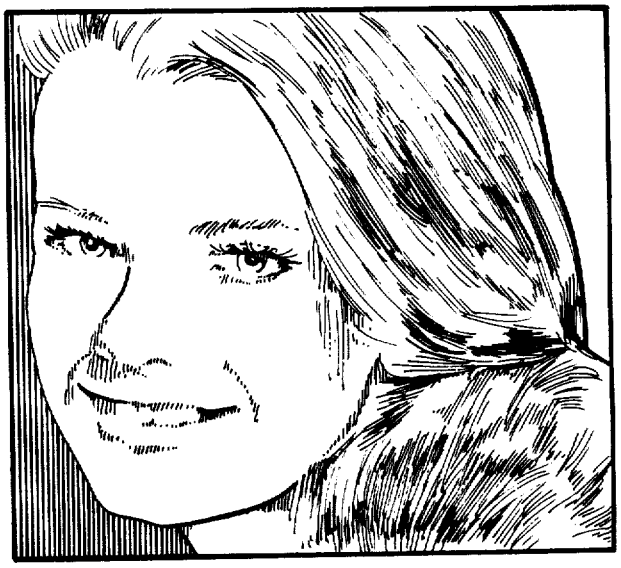
FIG. 1-B
STYLE #240
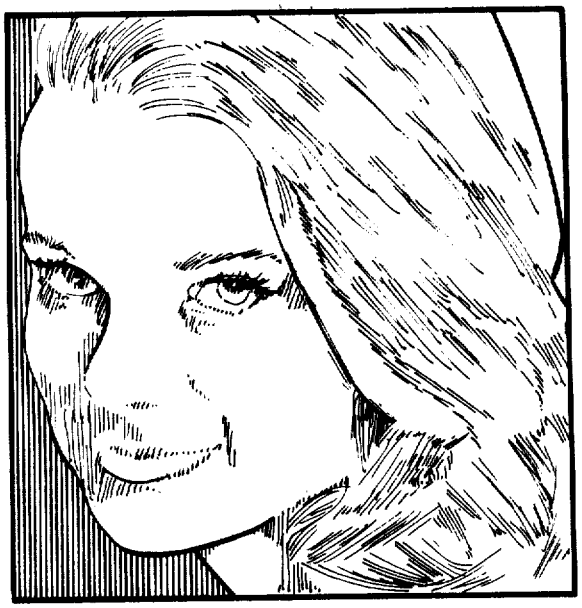
FIG. 1-C
STYLE #300
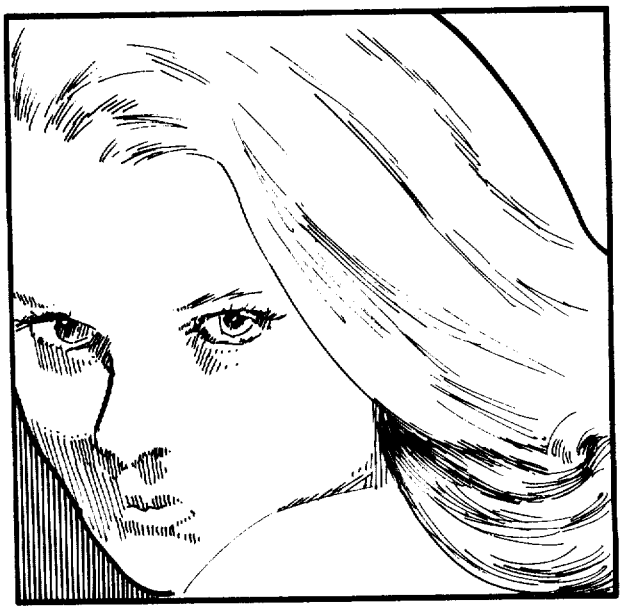
FIG. 1-D

DEVICE AND METHOD FOR PROGRAMMED HAIR COLORING

Matter enclosed in heavy brackets [ ] appears in the original patent but forms no part of this reissue specification; matter printed in italics indicates the additions made by reissue.

BACKGROUND OF THE INVENTION

Devices and their use in protecting a person's head and scalp and as aids in the course of effecting a hair treatment, dressing, tinting, dyeing, frosting, streaking or otherwise achieving various hair fashions and colorings are quite old in the art. These are sometimes referred to as "frosting caps", "hair treatment caps", "hair and scalp protectors", etc. They usually take the form of a cap or cover which is placed over the head and fastened in position. They are usually equipped with a plurality of holes or perforations through which strands of hair are pulled out with the aid of devices which may be crocheting needles. The bleaching, coloring, or treating material is then applied to the strands so pulled out. The remainder of the hair and scalp are protected from the action of the material or treatment by the body of the cap itself which is usually made of a plastic or some other resilient and impervious material. Upon removal of the cap from the head, the hair may either have the desired effect or may be subjected to further treatment.

The treatment given to the strands of hair may comprise hot or cold waving, or applying different coloring materials of innumerable shades to selected strands or locks as desired to produce a final hair effect. The various treating processes are known in the art as "frosting", "tipping", "streaking", "bleaching", which are generally descriptive terms. More exotic treatments producing various variegated effects are known variously as "rainbowing", "marbleizing", "highlighting", "haloing", "accenting", "flashing", "glazing", "naturalizing", etc. The basic procedures are much the same in all cases; the difference being in the coloring or treating materials and processes themselves and, of course, in the caps and related devices which are used to produce the various effects.

Prior art as presently known to applicant is set forth in summary form below.

Jourliac—British Pat. No. 507,232 (1937). Teaches use of head protecting bands equipped with slots through which locks of hair are withdrawn and then subjected to permanent wave treatment.

Nell—U.S. Pat. No. 2,618,274 (1952). Scalp protector comprising a covering to be wrapped around the head is equipped with slots permitting locks of hair to protrude so that cold wave or hot wave applications may be made.

Mach—U.S. Pat. No. 2,818,074 (1957). This cap uses two plys of perforations in which the perforations in each ply are offset from each other to effect greater protection to the scalp from the treating chemicals.

Widoff—U.S. Pat. No. 2,957,480 (1960). Teaches a perforated cap in combination with a solid cap to provide a dead air space for more effective treatment of the hairs in between.

Sobeck—U.S. Pat. No. 3,249,113 (1963). Teaches a cap with a multiplicity of dimples or recesses which may be punctured where desired and strands of hair pulled through for treatment.

Cook—U.S. Pat. No. 3,270,753 (1966). Teaches a cap with indentations which may be pierced or punctured by a suitable tool where desired in combination with reinforcing rings around each indentations.

Anderson—U.S. Pat. No. 3,304,945 (1967). Teaches a cap with slits through which locks of hair may be drawn for frosting, tipping or streaking, each of said slits being equipped with clamping means or jaws as holding locks of hair in place while being treated, preventing leakage of fluid.

Newman—U.S. Pat. No. 3,390,689 (1968). Teaches a cap with indentations which may be perforated or punctured, said indentations having protruberances outward and indentations inward for greater effectiveness.

Cook—U.S. Pat. No. 3,468,318 (1969). This is a divisional of Cook U.S. Pat. No. 3,270,753 above and teaches a guard or clamp for use in combination with holes or apertures in a cap.

Hall—U.S. Pat. No. 3,610,257 (1971). Teaches a cap having a plurality of tubular members connected to openings in the cap. Strands of hair may be pulled into the tubular openings and the streaking or frosting solutions applied.

None of the prior art discloses or claims a device and/or a method by which a predetermined effect or hair appearance may be definitely attained. All is left entirely to the skill and judgment of the professional hair dresser. The "do-it-yourself" individual has no aid she can use to get the desired result by herself. Even where professional hair dressers are used, none of the devices offer them any direct aid in producing an exact effect which their customer wants precisely and efficiently.

SUMMARY OF THE INVENTION

I have invented what I call my "compur-cap" (TM) or "photofrost" (TM) which makes possible the use of a precoded method of obtaining a given hair effect selected from a photographic illustration by the person desiring the treatment. The person may utilize my invention herself or it may be used by a professional hair dresser but basically it eliminates all the guess work and chance now associated with this art.

I utilize a more or less conventional cap equipped with holes or perforations but construct it for being definitely positioned upon the head of the user.

My perforations are identified by a predetermined code which comprises basically a color ring around each hole. In the embodiment described below I utilize six different colors and locate each around the holes in a predetermined manner, the latter in the embodiment shown here comprising a total of 420 holes in the cap.

I first provide photographic illustrations of the ultimate hair effect which is desired for selection by the person using my device and method.

I next provide a table to be used in conjunction with my device which sets forth which holes in my cap, the strands should be pulled through, identified by my color code, in order to produce the ultimate result desired, keyed or programmed to the desired effect.

After pulling the strands of hair through in a more or less conventional manner, they are treated likewise in any manner desired in accordance with previous instructions to achieve the ultimate result, exactly and precisely.

I have discovered that by use of my device and method I am able to eliminate all the uncertainty and guess work previously connected with this hair treatment of this nature, greatly simplifying the process and producing the unusal result of attaining an exact effect in accordance with a selected style or pattern.

I thus in effect provide a combination of devices and a program which when used together in the manner taught produces my novel and highly useful results.

DESCRIPTION OF THE DRAWINGS

FIGS. 1-A through 1-D represent typical hair effects or coloring styles which it may be desired to attain. These are identified as follows:

FIG. 1-A—Style No. 80
FIG. 1-B—Style No. 140
FIG. 1-C—Style No. 240
FIG. 1-D—Style No. 300.

DESCRIPTION OF A PREFERRED EMBODIMENT

Referring now to the figures and to FIGS. 1-A through 1-D, there are seen four typical coloring styles of hair which a person might be desirous of obtaining. These are designated as styles No. 80, No. 140, No. 240 and No. 300 respectively. In the illustrations shown these represent various degrees of "frosting". The person desiring the treatment in the illustrations shown may have hair of a uniform color or what is known as a "solid state" or her hair may have been previously treated by other methods. She selects one of the style shades shown and the method of achieving it is set forth more fully below.

Figure 2:
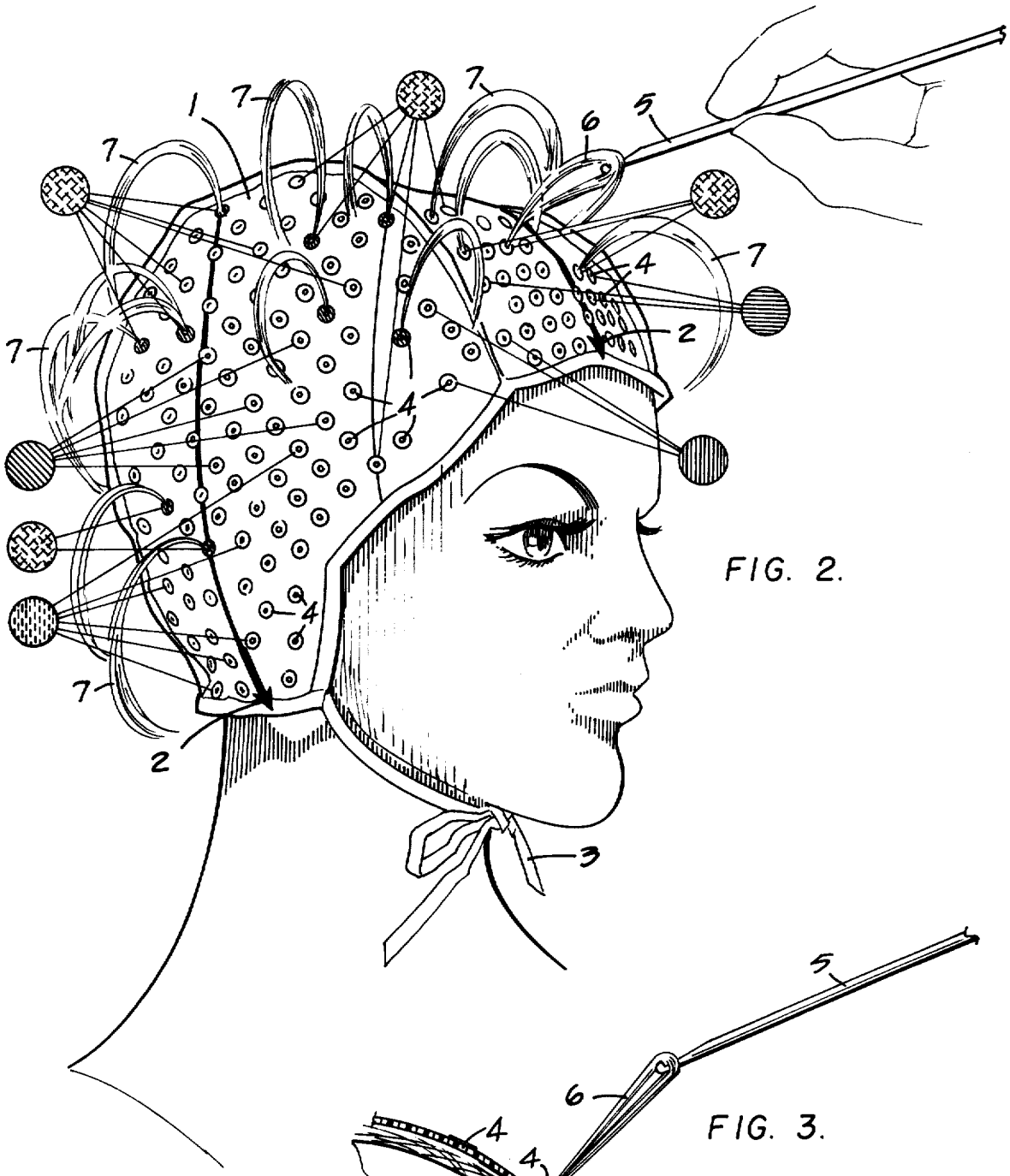
FIG. 2 shows my precoded cap device in position upon the head of the user.

Referring now to FIG. 2, there is shown the cap 1 in position on the head of the user. This cap may be made of plastic, elastomeric material or other material known in the art.

The arrows 2, one located in the center of the cap above the forehead and generally in line with the center of the nose and the other located approximately in the center of the ear, as shown. This is to insure proper positioning in order to obtain the exact result desired.

The bow 3 serves to secure the cap on the head of the user.

The holes 4 through the cap 1 are positioned in predetermined locations and are surrounded by colored rings also in predetermined locations around the holes. In the illustration shown there are six different colors as indicated, namely black, blue, orange, purple, green, and red, indicated by the standard symbols in patent drawings.

A hook 5 which is essentially a crochet hook or needle and may be what is usually known as a "size 6" in the art, but any other convenient size may be used. This hook is used to pull strands of hair 6 out to the holes 4, in accordance with the programmed series. Strands of hair completely pulled out through the hole 4 is shown at 7.

Figure 3:
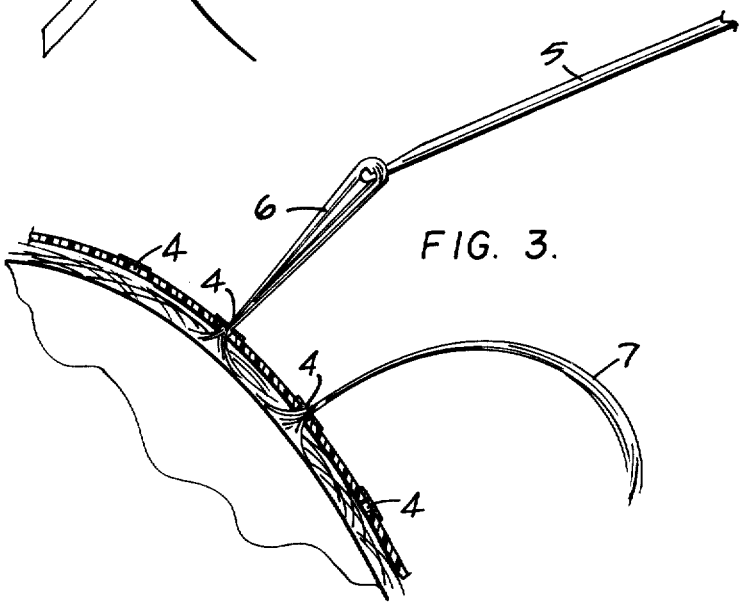
FIG. 3 shows a partial section through my cap indicating the method of pulling the hair strands through the cap for further processing.

Referring now to FIG. 3, there is shown for greater clarity the method of pulling the hair strands 6 through the holes 4 by means of hook 5 to the position 7.

The size of the hook to be used is governed by the physical characteristics of the person's hair to enable the strands to be most effectively pulled out through the holes.

Set forth below is a table which illustrates the program and the coordination between the color styles which it is desired to produce and the use of the "photo-frost" (TM) or "compur-cap" (TM) of my invention shown in FIG. 2.

TABLE A

PROGRAM & PLAN
Six Different Hole Colors
BLACK, BLUE, ORANGE, PURPLE, GREEN, RED

| STYLE NO OR PLAN (Desired Effect) | CODE OR PROGRAM (Color of Holes for Strands) |
|---|---|
| | BASIC PATTERNS |
| 20 | Black |
| 40 | Blue |
| 60 | Orange |
| *80 | Purple |
| | (Very slight streaking) |
| | (FIG. 1-A) |
| 100 | Green |
| 120 | Red |
| | COMBINATION PATTERNS |
| *140 | Black |
| | Red |
| | (Greater streaking |
| | FIG. 1-B) |
| 160 | Blue |
| | Red |
| 180 | Orange |
| | Red |
| 200 | Purple |
| | Red |
| 220 | Green |
| | Red |
| *240 | Black |
| | Green |
| | Red (Much greater |
| | Streaking FIG. 1-C) |
| 200 | Blue |
| | Green |
| | Red |
| 280 | Orange |
| | Green |
| | Red |
| *300 | Purple |
| | Green |
| | Red |
| | (Approaching entire uniformity |
| | FIG. 1-D) |
| 320 | Black |
| | Purple |
| | Green |
| | Red |
| 340 | Blue |
| | Purple |
| | Green |
| | Red |
| 360 | Orange |
| | Purple |
| | Green |
| | Red |
| 380 | Black |
| | Purple |
| | Green |
| | Red |
| 400 | Blue |
| | Orange |
| | Purple |
| | Green |
| | Red |
| 420 | Black |
| | Blue |
| | Orange |
| | Purple |
| | Green |
| | Red |
| | (Almost entire uniformity) |
| NUMBER OF HOLES | |

TABLE A-continued

| PROGRAM & PLAN | |
|---|---|
| Six Different Hole Colors | |
| BLACK, BLUE, ORANGE, PURPLE, GREEN, RED | |
| STYLE NO OR PLAN (Desired Effect) | CODE OR PROGRAM (Color of Holes for Strands) |
| (Corresponds to Style number of Basic Patterns) | |
| Black | 20 |
| Blue | 40 |
| Orange | 60 |
| Purple | 80 |
| Green | 100 |
| Red | 120 |
| | 420 |

*These styles shown on FIGS. 1-A through 1-D

OPERATION

In utilizing my device and method the person proceeds as follows. The person, who may be a brunette or blond desiring a slight amount of silver streaking would select style No. 80 shown in FIG. 1-A. She adjusts the cap on her head, positioning the arrows 2 as shown on FIG. 2 and fastening the bow 3.

Referring to Table A, it is seen that in order to attain the style 80 of FIG. 1-A it is necessary to pull out all the strands of hair opposite the holes having the purple identification. This is done by means of crochet hook 5.

When the strands 7 are all removed through all the holes having a purple color circle, the user then applies the bleach, tint, or coloring desired; in this illustration it would be a silver tint. This step, of course, is performed in the conventional manner.

After completion of the tinting or frosting in this case, the cap is removed, the hair combed out and the result is as shown in FIG. 1 which was what was selected.

In the illustration shown, if greater streaking is desired, style No. 140 may be selected as shown in FIG. 1-B in which case all the strands opposite the black and red identified holes in the cap are pulled through.

If considerably greater streaking is required as shown on style No. 240, FIG. 1-C, then referring again to Table A, it is seen that all strands of hair opposite the black, green and red identified holes in the compur-cap must be pulled out and treated.

In like manner if it is desired to achieve style No. 300 shown in FIG. 1-D which in this case approaches an entire uniformity of change of color, then all strands in purple, green and red identified holes are pulled out.

Where almost entire uniformity in change of color is required, which illustrations are not shown, then style 420, which represents the total number of holes in the cap of this embodiment and all six colors used in the embodiment shown are pulled through and treated.

It should now be evident to those skilled in the art that any number of permutations and combinations may be used to achieve any photographically exact effect desired.

For example, my device and method may be used for what is known as "reverse frosting" wherein a person whose hair is already light or gray wants to streak or color it with darker colors, all that is necessary is to consult the particular effect that it is desired to produce, as identified by the style number, apply the cap of my invention, pull through the strands indicated by the color code for that particular style obtained from the table and apply the suitable coloring.

It should be further evident to those skilled in the art that any one of the many exotic hair effects which it is desired to produce and which I have produced by the use of my invention may be achieved with great precision and accuracy by not only an experienced hair dresser but by the person herself by merely selecting a style from my catalog, applying the cap of my invention and proceeding according to the instructions. These, of course, I have not set forth in detail for every possible style but the use of my device and method of operation coordinated with the pertinent instructions remains basically the same.

While I have characterized my invention as partially a "program" or a "programming technique", it should be noted that I have actually invented a device which is combined with my "program" to produce my unusual results.

I claim:

1. A process for the treatment of hair upon a person's head to produce several desired definite hair color styles in accordance with a predetermined program by applying upon the head of the person a cap having a plurality of holes therethrough;

said holes being 420 in number and having an identifying specific color adjacent to each hole in predetermined arrangement;

said specific hole colors being six in number, 20 being black, 40 being blue, 60 being orange, 80 being purple, 100 being green and 120 being red;

said program comprising an illustration of each of said desired hair color styles, each style being associated with one of said identifying hole colors;

extracting strands of hair through all of the holes having the identifying color associated with said desired hair color style;

treating said strands so extracted with suitable coloring means;

removing said cap from said head of said person whereby six different hair color styles are produced.

2. The process of claim 1 in which said desired hair color styles are associated with combinations of two or more different identifying hole colors;

extracting strands of hair through all of the holes having said identifying hole colors associated with said desired color style;

treating said strands so extracted with suitable coloring means;

removing said cap from said head of said person whereby 15 different hair color styles are produced.

*3. A process for treatment of hair upon a person's head to produce several desired definite hair color styles in accordance with a predetermined program by applying upon the head of the person a cap having a plurality of holes therethrough;*

*said program comprising illustrations of each of said desired hair color styles;*

*each of said styles being identified with a set of holes positioned in predetermined locations on said cap;*

*each of said set of holes being identified by a different specific identifying color;*

*every hole in each of said sets having said identifying color positioned adjacent to it;*

*the number of holes in each set being identified with each of said hair color styles in accordance with said program;*

*the total number of holes in said cap being equal to the combined number of holes in all of said sets;*

*extracting strands of hair through the holes in said sets corresponding to said color style in accordance with said program;*

*treating said strands so extracted with a suitable coloring means;*

*removing said cap from the head of said person, whereby said desired hair color style is produced.*

*4. The process of claim 3 in which said desired hair color styles are identified with two or more sets of holes in said caps.*

*5. The process of claim 3 in which said sets of holes are six in number comprising:*

*a first set having twenty holes identified by a black color;*

*a second set having forty holes identified by a blue color;*

*a third set having sixty holes identified by an orange color;*

*a fourth set having eighty holes identified by a purple color;*

*a fifth set having one hundred holes identified by a green color;*

*a sixth set having one hundred and twenty holes identified by a red color;*

*the total number of holes being four hundred and twenty.*

* * * * *